US008627054B2

(12) United States Patent
Ayanam et al.

(10) Patent No.: US 8,627,054 B2
(45) Date of Patent: Jan. 7, 2014

(54) METHOD AND APPARATUS TO CREATE SINGLE FIRMWARE IMAGE FOR MULTIPLE SERVER PLATFORMS

(75) Inventors: Varadachari Sudan Ayanam, Suwanee, GA (US); Baskar Parthiban, Johns Creek, GA (US)

(73) Assignee: American Megatrends, Inc., Norcross, GA (US)

( * ) Notice: Subject to any disclaimer, the term of this patent is extended or adjusted under 35 U.S.C. 154(b) by 364 days.

(21) Appl. No.: 12/981,441

(22) Filed: Dec. 29, 2010

(65) Prior Publication Data

US 2012/0173858 A1 Jul. 5, 2012

(51) Int. Cl.
- G06F 15/177 (2006.01)
- G06F 9/00 (2006.01)
- G06F 9/24 (2006.01)
- G06F 11/00 (2006.01)

(52) U.S. Cl.
USPC ............... 713/2; 713/1; 713/100; 714/15

(58) Field of Classification Search
None
See application file for complete search history.

(56) References Cited

U.S. PATENT DOCUMENTS

| | | | |
|---|---|---|---|
| 5,768,568 A * | 6/1998 | Inui et al. ..................... | 710/16 |
| 6,356,965 B1 | 3/2002 | Broyles et al. | |
| 6,385,682 B1 | 5/2002 | Emerson et al. | |
| 6,490,637 B1 * | 12/2002 | Shih ............................. | 710/8 |
| 6,496,858 B1 | 12/2002 | Frailong et al. | |
| 6,560,704 B2 * | 5/2003 | Dieterman et al. ........... | 713/100 |
| 6,792,479 B2 * | 9/2004 | Allen et al. .................. | 710/10 |
| 7,856,549 B2 | 12/2010 | Wheeler | |
| 2002/0087724 A1 | 7/2002 | Datta et al. | |
| 2003/0233450 A1 | 12/2003 | Carley | |
| 2005/0091360 A1 | 4/2005 | Chen et al. | |
| 2005/0149924 A1 * | 7/2005 | Komarla et al. .............. | 717/176 |
| 2005/0188070 A1 | 8/2005 | Tripathi et al. | |
| 2005/0257040 A1 | 11/2005 | Choi et al. | |
| 2008/0021978 A1 | 1/2008 | Maynard et al. | |
| 2008/0037553 A1 | 2/2008 | Gilmartin et al. | |
| 2008/0184022 A1 * | 7/2008 | Peacock ........................ | 713/2 |
| 2009/0282284 A1 | 11/2009 | Naohiro et al. | |
| 2010/0005283 A1 | 1/2010 | Ha | |
| 2010/0115253 A1 * | 5/2010 | Lipsky et al. ................. | 713/1 |
| 2010/0180031 A1 | 7/2010 | Cacheria et al. | |
| 2011/0055824 A1 | 3/2011 | Benari | |
| 2011/0202983 A1 | 8/2011 | Pope et al. | |
| 2011/0276625 A1 | 11/2011 | Shah | |
| 2011/0292807 A1 | 12/2011 | Shah et al. | |
| 2011/0296130 A1 | 12/2011 | Abe et al. | |

* cited by examiner

Primary Examiner — Ji H Bae
(74) Attorney, Agent, or Firm — Morris, Manning & Martin, LLP; Tim Tingkang Xia, Esq.

(57) ABSTRACT

According to one aspect, a computer-implemented method for managing a computer system is disclosed. In one embodiment, the computer system includes a processor that is programmed to cause the computer system to perform specific functions. The functions include: initializing a management controller operating on a management platform; detecting preloaded identification data containing a predetermined manufacturer-specific platform identifier; if no preloaded identification data is detected, determining the platform identifier based on GPIO settings, firmware data, EEPROM data, and/or sensor detection; detecting preloaded hardware data containing operating parameters for hardware components operating on the management platform and operatively coupled to the management controller; if no preloaded hardware data is detected, determining the operating parameters according to the platform identifier; causing the management controller to initialize the hardware components according to the platform identifier and operating parameters; and, flashing initialization data containing the platform identifier and operating parameters to a system memory.

29 Claims, 3 Drawing Sheets

METHOD AND APPARATUS TO CREATE SINGLE FIRMWARE IMAGE FOR MULTIPLE SERVER PLATFORMS

FIELD OF THE INVENTION

The present invention generally relates to management of computer systems, and more particularly to detection and identification of a platform, and platform monitoring during run time.

BACKGROUND OF THE INVENTION

A baseboard management controller (BMC) is a specialized microcontroller embedded on the motherboard of a computer, generally a server. The BMC manages the interface between system management software and platform hardware. Various types of sensors can be built into a computer system and the BMC can read the sensors to determine specific parameters related to operation of the computer system, such as temperature, cooling fan speeds, power status, and operating system (OS) status. The BMC is operative to monitor the sensors and can send alerts to a system administrator via a network if one or more of the parameters are outside of predetermined ranges or limits. An administrator can remotely communicate with the BMC to take corrective action, for example resetting or power cycling the system.

A server manufacturer may design similar hardware but with varying configurations, for instance a 1U versus a 2U system. Differences can be in the platform sensors and porting, for example differing numbers of fans and/or LEDs. There is a need for a BMC as a platform management device to support not only generic features but also to have the capability to handle platform-specific differences. Further, there is a need for the BMC to be capable of handling the platform detection and the platform monitoring during run time.

Therefore, a heretofore unaddressed need still exists in the art to address the aforementioned deficiencies and inadequacies.

SUMMARY OF THE INVENTION

In one aspect, the present invention relates to a computer-implemented method for managing a computer system having a processor that is programmed to cause the computer system to perform functions according to operational steps of the method. According to one embodiment, the execution of a boot loader is initiated, from firmware stored in a system memory, to initialize a management controller operating on a management platform. Preloaded identification data is detected, where the preloaded identification data contains a predetermined manufacturer-specific platform identifier ("platform ID") that corresponds to the management platform. If no preloaded identification data is detected, then the platform ID is determined based on one or more of GPIO settings on the management controller, firmware data, EEPROM data, and sensor detection. Detection of preloaded hardware data is performed, where the hardware data contains operating parameters for a plurality of hardware components that operate on the management platform and that are operatively coupled to the management controller. In one embodiment the plurality of hardware components includes a network interface means and the host computer is managed by a remote management computer running a management client application, via network communication link that is coupled to the management computer and the network interface means.

If no preloaded hardware data is detected, then operating parameters are determined according to the platform ID. The management controller initializes the hardware components according to the platform ID and particular operating parameters. Initialization data containing the platform ID and the operating parameters is flashed to the system memory. In one embodiment, flashing initialization data includes combining the platform ID and operating parameters into a single flash image and flashing the single flash image to the firmware. The flashed single flash image is configured such that it can be used by the boot loader in a subsequent iteration of initializing the management controller.

In one embodiment, the management controller is a baseboard management controller ("BMC") of a managed host computer that has the plurality of hardware components. The hardware components operate in the management platform and are communicatively coupled to the BMC. The BMC is communicatively coupled to a remote management computer that is operative to control functions performed by the BMC and to communicate data associated with operations of the hardware components via one or more network connections.

In one embodiment, detecting the platform ID based on GPIO settings includes reading predetermined strapping values from one or more dedicated GPIO pins of the management controller. The step of detecting the platform ID based on firmware data includes reading the platform ID from stored data in the firmware. Detecting the platform ID based on EEPROM data includes reading the platform ID from stored data in an EEPROM device that is operatively associated with the host computer. The step of determining the platform ID based on sensor detection is performed if the platform ID cannot be determined based on at least one of GPIO settings, firmware data, and EEPROM data.

Determining the platform ID based on sensor detection includes detecting one or more active sensors that are operatively coupled to the management controller and that are operative to monitor the operation of one or more of the hardware components based on the operating parameters. Each of a plurality of different manufacturer-specific platform IDs is definable by a particular configuration of sensors, such that the platform ID is determinable based on the detected active sensors. The platform ID is then determined based on the detected one or more active sensors. In one embodiment, the one or more active sensors include at least one of a temperature sensor, power status sensor, and network interface sensor.

According to another aspect, the present invention relates to a computer-readable medium with stored computer-executable instructions which, when executed by a programmable processor of a computer system, cause the computer system to perform specific functions. According to one embodiment, the functions include initiating the execution of a boot loader from firmware stored in a system memory, to initialize a management controller that operates on a management platform. The functions further include detecting preloaded identification data containing a predetermined manufacturer-specific platform ID corresponding to the management platform. The functions also include, if no preloaded identification data is detected, determining the platform ID based on one or more of GPIO settings on the management controller, firmware data, EEPROM data, and sensor detection. The functions additionally include detecting preloaded hardware data containing operating parameters for a plurality of hardware components that operate on the server management platform and that are operatively coupled to the management controller. If no preloaded hardware data is detected, then the operating parameters are determined according to the platform ID. In one embodiment, the hardware components include a network interface means and the host computer is managed by a remote management computer running a management client application, via a network connection that is operatively connected to the host computer and the management controller.

The functions also include causing the management controller to initialize the hardware components according to the platform ID and operating parameters, and flashing the initialization data containing the platform ID and operating parameters to the system memory.

In one embodiment, detecting the platform ID based on GPIO settings includes reading predetermined strapping values from one or more dedicated GPIO pins of the management controller. Detecting the platform ID based on firmware data includes reading the platform ID from stored data in the firmware that is operatively associated with the host computer. Detecting the platform ID based on EEPROM data includes reading the platform ID from stored data on an EEPROM device that is operatively associated with the host computer. Determining the platform ID based on sensor detection is performed if the platform ID cannot be determined based on at least one of GPIO settings, firmware data, and EEPROM data.

Determining the platform ID based on sensor detection includes detecting one or more active sensors that are operatively coupled to the management controller and that are operative to monitor the operation of one or more of the hardware components based on the operating parameters. Each of a plurality of different manufacturer-specific platform IDs is definable by a particular configuration of sensors, and the platform ID is then determined based on the detected one or more sensors. In one embodiment, the one or more sensors include a temperature sensor, power status sensor, and network interface sensor.

In yet another aspect, the present invention relates to a computer system. According to one embodiment, the computer system includes a management controller, system memory with a firmware, a plurality of hardware components operating on a management platform and operatively coupled to the management controller, and a programmable processor. The processor is programmed to cause the computer system to initiate the execution of a boot loader from the firmware. The boot loader is operative to initialize the management controller to operate on the management platform. The processor is further programmed to detect preloaded identification data containing a predetermined manufacturer-specific platform ID corresponding to the management platform. The processor is also programmed to, if no preloaded identification data is detected, determine the platform ID based on one or more of the GPIO settings on the management controller, firmware data, EEPROM data, and sensor detection. The processor is further programmed to detect preloaded hardware data containing operating parameters for the hardware components and, if no preloaded hardware data is detected, determine the operating parameters according to the platform ID. Also, the processor is programmed to cause the management controller to initialize the hardware components according to the platform ID and operating parameters, and to flash the initialization data containing the platform ID and operating parameters to the system memory.

In one embodiment, the firmware has a flash firmware image that is utilized by the boot loader to initialize the management controller. Flashing the initialization data containing the platform ID and operating parameters to the system memory includes combining the platform ID and operating parameters to form a single flash image and flashing the single flash image to the system memory such as to replace a prior firmware image. The stored single flash image is configured such as to be usable by the boot loader in a subsequent iteration of initializing the management controller.

Detecting the platform ID based on GPIO settings includes reading predetermined strapping values from one or more dedicated GPIO pins of the management controller. Detecting the platform ID based on firmware data includes reading the platform ID from stored data in the firmware. Detecting the platform ID based on EEPROM data includes reading the platform ID from stored data on an EEPROM device that is operatively associated with the managed host computer. Determining the platform ID based on sensor detection includes detecting the sensors of a plurality of sensors that are active to monitor the condition of at least one of the hardware components, based on the operating parameters. The plurality of sensors are operatively coupled to the management controller, and, in one embodiment, include one or more of a temperature sensor, power status sensor, network interface sensors, and cooling means status sensor.

In one embodiment, the hardware components include one or more of a power regulation means, network interface means, and cooling means. The platform ID is definable by configuration data corresponding to active sensors. The configuration data includes one or more of the number, arrangement, and operating parameters of the sensors, and determining the platform ID includes matching the configuration data with a corresponding stored one of a plurality of different defined platform IDs.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
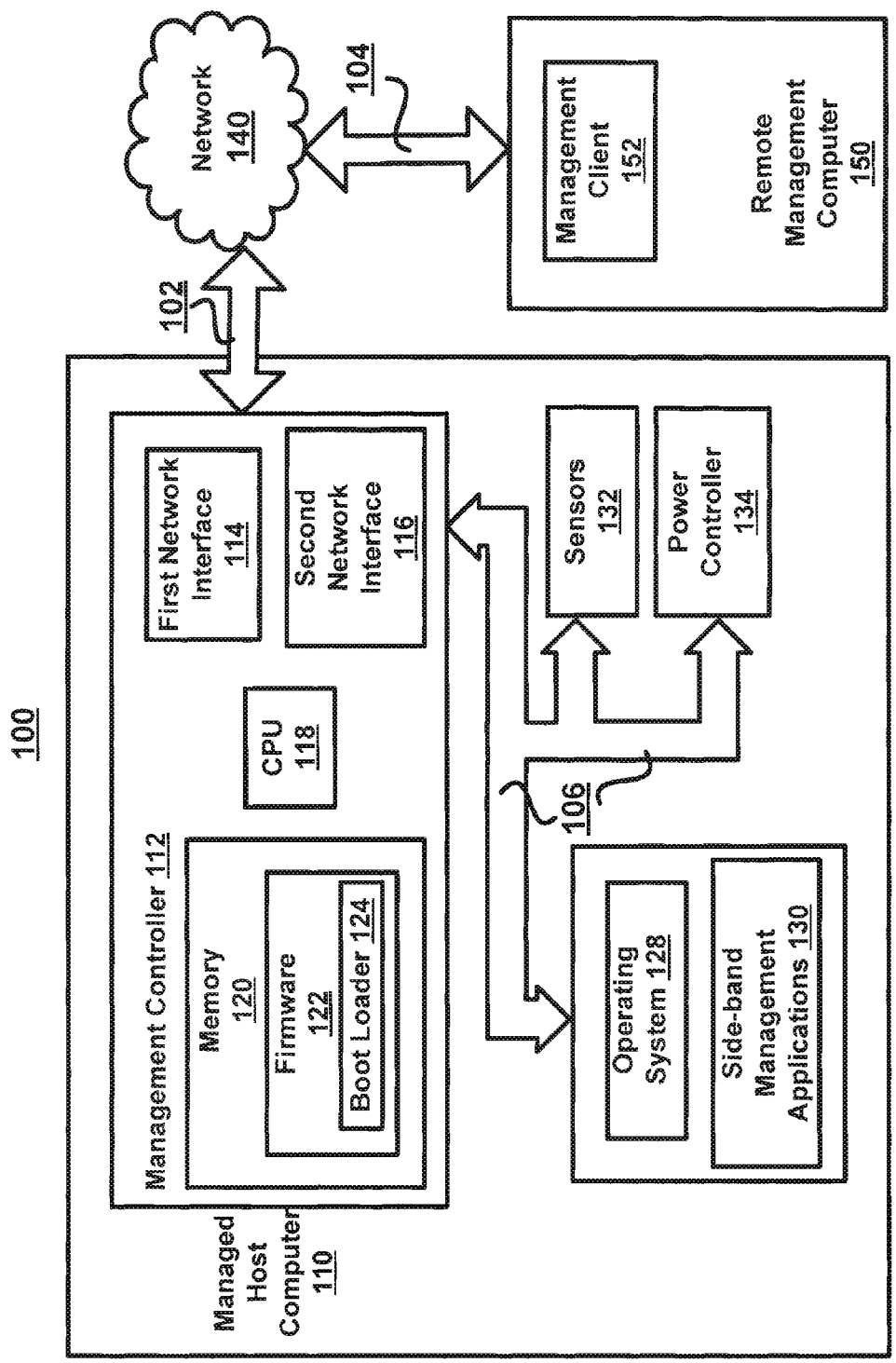
FIG. 1 schematically shows a computer system with a management controller and hardware components operating on a management platform, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-3. According to one aspect, the present invention relates to a computer system. According to one embodiment, the computer system 100 has a management controller 112, a system memory 120 with a firmware 122, and a plurality of hardware components 114, 116, and 134 that operate on a management platform and are operatively coupled to the management controller 112. As shown, a programmable processor ("CPU") 118 is also provided.

The programmable processor 118 is programmed to cause the computer system 100 to perform functions according to operational steps of a method. In one embodiment, the functions performed include initiating the execution of a boot loader 124 from firmware 122 stored in a system memory 120, to initialize a management controller 112 operating on a management platform. The functions further include detecting preloaded identification data containing a predetermined manufacturer-specific platform ID corresponding to the management platform.

If no preloaded identification data is detected, then the platform ID is determined based on at least one of GPIO settings on the management controller 112, firmware data stored in firmware 122, EEPROM data stored on an EEPROM device, and sensor detection. The functions also include detecting preloaded hardware data containing operating parameters for a plurality of hardware components 114, 116, 134 operating on the server management platform and operatively coupled to the management controller 112. If no preloaded hardware data is detected, the operating parameters are determined according to the platform ID. The functions performed additionally include causing the management controller 112 to initialize the plurality of hardware components 114, 116, 134 according to the platform ID and operating parameters, and flashing the initialization data containing the platform ID and operating parameters to the system memory 120.

In one embodiment the management controller 112 is a baseboard management controller (BMC) of a managed host computer 110 having the plurality of hardware components 114, 116, and 134. The plurality of hardware components 114, 116, and 134 operate on the management platform and are communicatively coupled to the BMC 112. The BMC 112 is communicatively connected to a remote management computer 150 that is operative to control functions performed by the BMC 112 and to communicate data associated with operations of the plurality of hardware components 114, 116, and 134, via at least one network connection. As shown in FIG. 1, communication link 102 is communicatively coupled with one or both of the first network interface 114 and second network interface 116, and is also connected to network 140. Communication link 104 is communicatively coupled with the remote management computer 150 and is connected to the network 140.

In one embodiment, the firmware 122 of system memory 120 contains a flashed firmware image that is utilized by the boot loader 124 to initialize the management controller 112. The firmware image contains initialization data with the platform ID and operating parameters associated with functions performed by the plurality of hardware components 114, 116, and 134 A plurality of sensors 132 are operatively coupled to the management controller 112 and are operative to monitor the condition of at least one of the plurality of hardware components 114, 116, 134 based on the operating parameters.

The plurality of hardware components 114, 116, 134 includes a power regulation means 134, network interface means 114, 116, and cooling means (not shown). In one embodiment, sensors 132 are operable to be detected as active sensors running on the management platform. The sensors 132 include one or more of a temperature sensor, power status sensor, and network interface sensor. The plurality of hardware components 114, 116, and 134 includes a first network interface means 114 and a second network interface means 116, and the host computer 110 is managed by a remote management computer 150 running a management client application 152, via network communication links 102 and 104, which are operatively coupled to one or both of the first network interface means 114 and second network interface means 116. The communication links are communicatively connected to a network 140.

In another aspect, the present invention relates to computer-implemented method for managing a computer system. According to one embodiment, a processor of a computer system is programmed to cause the computer system to perform operational steps of a method. Now referring specifically to the embodiment shown in FIG. 2, the method 200 includes the step 201 of initiating the execution of a boot loader from firmware stored in a system memory, to initialize a management controller operating on a management platform.

In one embodiment, upon boot the management controller checks to determine if platform detection and loading of platform sensor data has already been performed. The management platform has a particular, predetermined manufacturer-specific platform ID. In one embodiment, determining if detection and platform sensor data loading has already been performed includes checking to determine if SDR.dat is present and, if not present, performing platform detection and loading platform sensor data. In another embodiment, determining if detection and sensor data loading has already been performed includes checking for a specific platform ID in a pre-set non-volatile memory location and, if a platform ID is not present, performing platform detection and loading platform sensor data. With regard to loading platform sensor data, in one embodiment the management controller has a master list of platform porting information in a configuration file called SDRMaster.dat. This configuration file is demarcated using platform IDs, for example as follows:

```
                                                    [Platform ID A1]
----------------------------------------------------
                                                    [Platform ID A2]
----------------------------------------------------
```

In one embodiment, once the management platform ID is available, the sensor configuration file is parsed using the platform ID and the necessary platform sensor data is read to be utilized for performing platform initialization, for example setting fan speed and/or blinking LEDs.

Referring again to FIG. 2, from step 201 operation proceeds to step 203, where it is determined if the platform ID can be detected from preloaded identification data. If the platform ID cannot be detected at step 203, then operation proceeds to steps 207 and 209, where it is determined if the platform ID can be detected from settings on one or more GPIO pins of the management controller. If the platform ID cannot be detected at steps 207 and 209, then operation proceeds to steps 211 and 213, where it is determined if the platform ID can be detected from data stored in firmware. If the platform ID cannot be detected at steps 211 and 213, then operation proceeds to steps 215 and 217, where it is determined if the platform ID can be detected from data stored on an EEPROM that is operationally coupled to the management controller. If the platform ID cannot be detected at steps 215 and 217, then operation proceeds to steps 219, 221, and 223, where sensor detection is performed.

Figure 2:
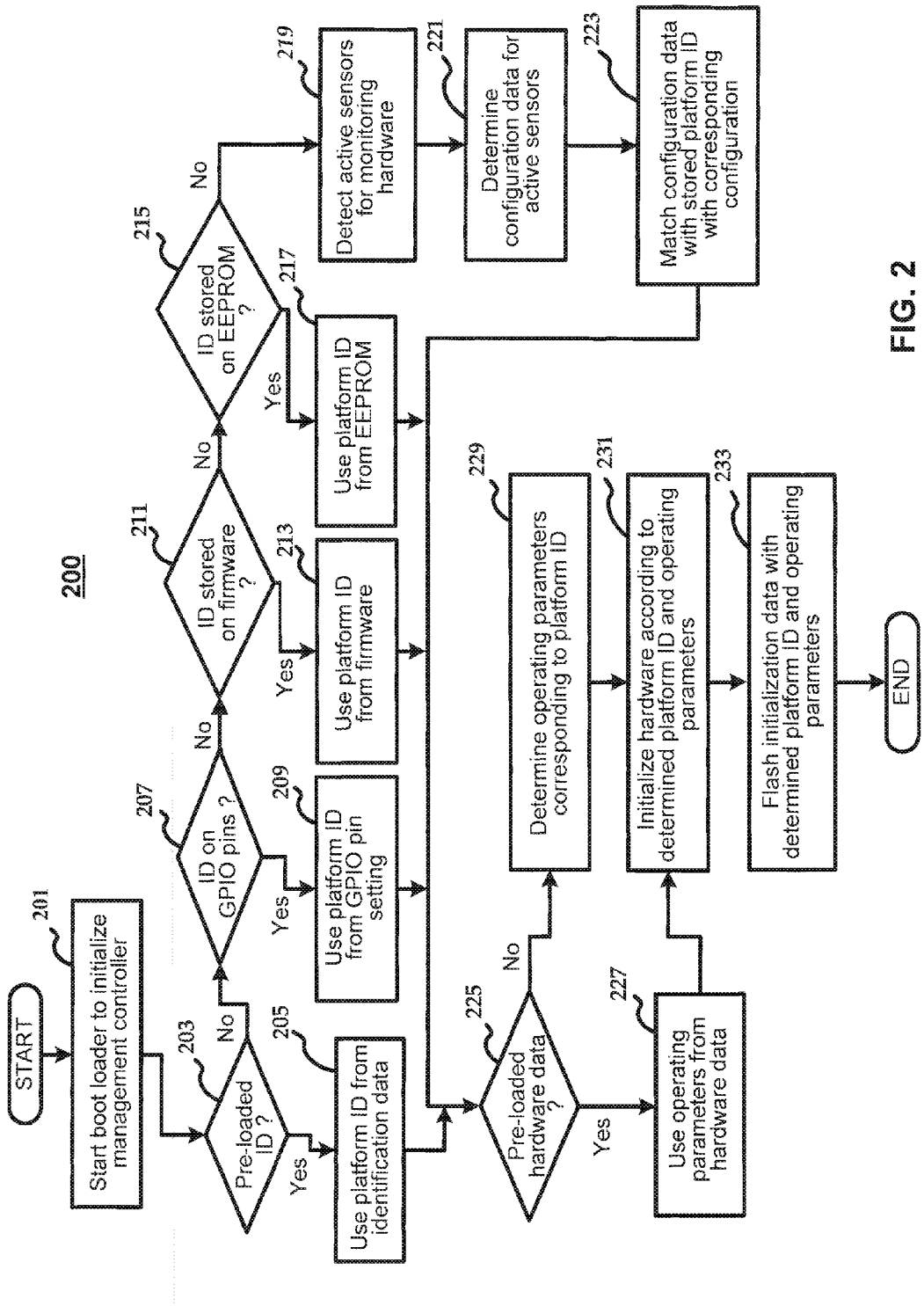
FIG. 2 is a flow chart illustrating operational steps of a computer-implemented method for managing a computer system, according to one embodiment of the present invention.

Those skilled in the art will recognize that the order of progression from preloaded identification data, GPIO settings, firmware data, EEPROM data, or sensor detection can be varied from the order shown according to the embodiment of FIG. 2 without departing from the scope of the present invention. Further, those skilled in the art will recognize that each of these detection methods can alternatively be performed simultaneously rather than along a serial progression. Still further, those skilled in the art will recognize that the platform ID can be determined based on more than one of these detection methods used in conjunction, for example where one detection method may be able to detect data containing information that partially contributes to determining the platform ID and another detection method is able to contribute the complimentary information such that the sum of the information leads to the determination of the platform ID.

According to the embodiment of the method 200 shown in FIG. 2, once the platform ID is detected from one of preloaded identification data, GPIO pin settings, firmware data, EEPROM data, or sensor detection data, then operation proceeds to step 225, where it is determined if operating parameters can be detected from preloaded hardware data. The operating parameters correspond to parameters for functions performed by a plurality of hardware components that operate on the management platform and are operatively coupled to the management controller. If operating parameters cannot be detected from preloaded hardware data, then operation proceeds to step 225 and 229, where it is determined if the operating parameters can be determined based on the detected platform ID. Once the operating parameters are determined based on from one of steps 227 and 229, then operation proceeds to 231, where the management controller is caused to initialize the plurality of hardware components according to the platform ID and operating parameters. From step 231, operation proceeds to step 233, where initialization data containing the platform ID and operating parameters is flashed to the system memory.

According to one embodiment, the steps 207 and 209 of detecting the platform ID based on GPIO settings include reading predetermined strapping values from one or more dedicated GPIO pins of the management controller. Hardware strapping is a method by which hardware lines can be set to a predetermined level (value) during manufacturing. A management controller such as a BMC is itself a processor with many GPIO pins available for various purposes. Hardware strapping utilizes some of these GPIOs for platform detection. Depending on the number of platforms intended to be manufactured, a specific number of GPIOs can be chosen. For example, two GPIOs can be used for manufacturing four platforms. The number of platforms can be set to follow $2^n$, where n is the number of GPIOs. During hardware manufacturing, the dedicated platform detection GPIOs of the management controller can be pre-programmed to a known value based on an individual platform.

The steps 211 and 213 of detecting the platform ID based on firmware data include reading the platform ID from stored data in the firmware 122. In a computer server, the BMC and a BIOS are two key components that are operative to communicate with each other to transfer necessary information. A system BIOS using a low pin count (LPC) bus is a common means for communication. BIOS development is also platform dependent, and accordingly some server manufacturers embed the platform ID. The BIOS can send out the platform ID via LPC interface to the management controller, and the management controller then utilizes the platform ID.

Detecting the platform ID based on EEPROM data, corresponding to steps 215 and 217, includes reading the platform ID from stored data on an EEPROM device that is operatively associated with the host computer.

The steps 219, 221, and 223 of determining the platform ID based on sensor detection are performed if the platform ID cannot be determined based on one or more of the GPIO settings, firmware data, and EEPROM data. In one embodiment, the management controller has a list of unique sensors and platform IDs for each of a plurality of platforms. Upon boot, the management controller attempts to access/probe) each of the sensors and, if access is successful to any one of the sensors, the management controller utilizes the corresponding platform ID. The probe logic can be tailored based on the number of the platforms and sub-platforms. Exemplary logic is as follows:

If Sensor A succeeds, then if Sensor A1 succeeds→Platform A1, else→Platform A2;

If Sensor A fails, then if Sensor B1 succeeds→Platform B1, else→Platform B2.

Step 219 corresponds to detecting one or more active sensors that are operatively coupled to the management controller and that are operative to monitor the operation of one or more of a plurality of hardware components based on the operating parameters. Steps 221 and 223 correspond to determining the platform ID based on the one or more detected active sensors, where each of a plurality of different manufacturer-specific platform IDs is definable by a particular configuration of sensors. In one embodiment, the type, arrangement, configuration and/or other detectable characteristics of the active sensors are matched with known characteristics that are exclusively associated with one specific platform, thereby resulting in determination of the platform ID.

In one embodiment, the sensors that are operable to be detected as active sensors include one or more of a temperature sensor, power status sensor, and network interface sensor. The plurality of hardware components includes a first network interface means and a second network interface means, and the host computer is managed by a remote management computer running a management client application, via network communication links that are operatively coupled to one or both of the first network interface means and second network interface means. The communication links are communicatively connected to a network.

In one embodiment, the step 233 of writing initialization data includes combining the platform ID and operating parameters into a single flash image and flashing the single flash image to the firmware. The single flashed image is configured such that it is able to be utilized by the boot loader in one or more subsequent iterations of performing the functions according to method 200. In one embodiment, parsed sensor data is copied to a file called SDR.dat. Subsequent management controller boot operations utilize SDR.dat for platform initialization. During a first boot of the management controller, this file is empty. In another embodiment, the platform ID is written to a pre-set non-volatile memory that is readable for future boot operations for the management controller.

In yet another aspect, the present invention relates to a computer-readable medium having stored thereon computer-executable instructions which, when executed by a programmable processor of a computer system, cause the computer system to perform a plurality of functions. In one embodiment, the functions include initiating the execution of a boot loader from firmware stored in a system memory to initialize a management controller operating on a management platform, and detecting preloaded identification data containing a predetermined manufacturer-specific platform ID corresponding to the management platform. The functions also include, if no preloaded identification data is detected, determining the platform ID based on one or more of GPIO settings on the management controller, firmware data, EEPROM data, and sensor detection. Additionally, the functions include detecting preloaded hardware data containing operating parameters for a plurality of hardware components operating on the server management platform and operatively coupled to the management controller. In one embodiment, the plurality of hardware components includes a network interface means, and the host computer is managed by a remote management computer running a management client application, via communication links operatively connected to the host computer and the management controller.

The functions further include, if no preloaded hardware data is detected, determining the operating parameters according to the platform ID and causing the management controller to initialize the plurality of hardware components according to the platform ID and operating parameters. Still further, the functions performed include flashing the initialization data containing the platform ID and operating parameters to the system memory.

In one embodiment, the function of detecting the platform ID based on GPIO settings includes reading predetermined strapping values from at least one dedicated GPIO pin of the management controller. The function of detecting the platform ID based on firmware data includes reading the platform ID from stored data in the firmware that is operatively associated with the host computer. The function of detecting the platform ID based on firmware data includes reading the platform ID from stored data in the firmware that is operatively associated with the host computer. The function of detecting the platform ID based on EEPROM data includes reading the platform ID from stored data in an EEPROM device that is operatively associated with the host computer.

The function of determining the platform ID based on sensor detection is performed if the platform ID cannot be determined based on one or more of GPIO settings, firmware data, and EEPROM data. The function of determining the platform ID based on sensor detection includes detecting one or more active sensors that are operatively coupled to the management controller and operative to monitor the operation of one or more of the plurality of hardware components based on the operating parameters, where each of a plurality of different manufacturer-specific platform IDs is definable by a particular configuration of sensors. In one embodiment, the type, arrangement, configuration and/or other detectable characteristics of the detected active sensors are matched with known characteristics that are exclusively associated with one specific platform, thereby resulting in determination of the platform ID.

Figure 3:
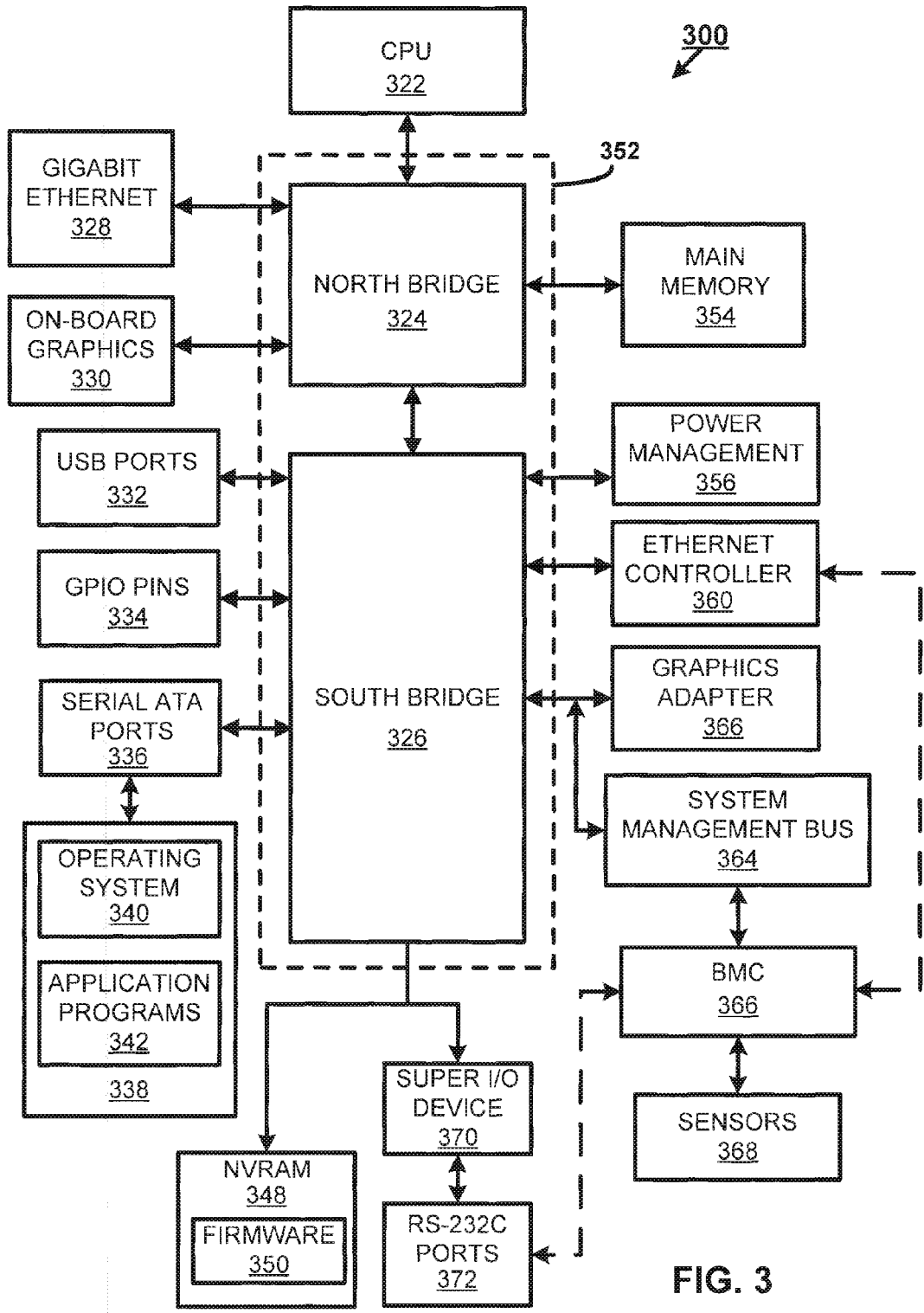
FIG. 3 schematically shows architecture of a computer system according to one or more embodiments of the present invention.

FIG. 3 schematically shows computer architecture for various computing systems utilized according to one or more embodiments of the present invention. Those skilled in the art will recognize that although the embodiments described herein are discussed in the context of server computers, other types of computing devices may be utilized. Further, those skilled in the art will also recognize that the architecture shown in FIG. 3 may be utilized to embody a managed host computer or management client computer.

The architecture shown in FIG. 3 corresponds to a computer 300 having a baseboard, or "motherboard", which is a printed circuit board to which components or devices may be connected by way of a system bus or other electrical communication path. In one embodiment, a central processing unit ("CPU") 322 operates in conjunction with a chipset 352. The CPU 322 is a standard central processor that performs arithmetic and logical operations necessary for the operation of the computer. The chipset 352 includes a north bridge 324 and a south bridge 326, where the north bridge 324 provides an interface between the CPU 322 and the remainder of the computer 300. The north bridge 324 also provides an interface to a random access memory ("RAM") used as the main memory 354 in the computer 300 and, optionally, to an onboard graphics adapter 330. The north bridge 324 may also include functionality for providing networking functions through a gigabit Ethernet adapter 328. The gigabit Ethernet adapter 328 is operative to connect the computer 300 to another computer via a network. Connections which may be made by the network adapter 328 include LAN or WAN connections. As shown, the north bridge 324 is connected to the south bridge 326.

The south bridge 326 is operative to control many of the input/output functions of the computer 300. In particular, the south bridge 326 may provide one or more universal serial bus ("USB") ports 332, an Ethernet controller 360, and one or more general purpose input/output ("GPIO") pins 334. The south bridge 326 may also provide a bus for interfacing peripheral card devices such as a graphics adapter 362. In one embodiment, the bus comprises a peripheral component interconnect ("PCI") bus. The south bridge 326 may also provide a system management bus 364 for use in managing the various components of the computer 300, and a power management module 356.

The south bridge 326 is also operative to provide one or more interfaces for connecting mass storage devices to the computer 300. For instance, according to an embodiment, the south bridge 326 includes a serial advanced technology attachment ("SATA") adapter for providing one or more serial ATA ports 336. The serial ATA ports 336 may be, in turn, connected to one or more mass storage devices storing an operating system 340 and application programs 342, such as the SATA disk drive 338. Those skilled in the art will recognize that an operating system 340 has a set of programs that control operations of a computer and allocation of resources. An application program is software that runs on top of the operating system software, or other runtime environment, and uses computer resources to perform application specific tasks desired by the user.

The mass storage devices connected to the south bridge 326, and their associated computer-readable media, provide non-volatile storage for the computer 300. Although the description of computer-readable media contained herein refers to a mass storage device, such as a hard disk or CD-ROM drive, those skilled in the art will recognize that computer-readable media can be any available media that can be accessed by the computer 300. Computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge for connecting a "Super I/O" device 370. The Super I/O device 370 is responsible for providing a number of input/output ports, including a keyboard port, a mouse port, a serial interface 372, a parallel port, and other types of input/output ports. The LPC interface may also connect a computer storage media such as a ROM or a flash memory such as a NVRAM 348 for storing the firmware 350 that includes program code containing the basic routines that are operative to start up the computer 300 and to transfer information between elements within the computer 300.

As described briefly above, the south bridge 326 may include a system management bus 364. The system management bus 364 may include a baseboard management controller ("BMC") 366. In general, the BMC 366 is a microcontroller that monitors operation of the computer system 300. In a more specific embodiment, the BMC 366 monitors health-related aspects associated with the computer system 300, such as the temperature of one or more components of the computer system 300, speed of rotational components (e.g., spindle motor, CPU Fan, etc.) within the system, the voltage across or applied to one or more components within the system 300, and the available or used capacity of memory devices within the system 300. To accomplish these monitoring functions, the BMC 366 is communicatively connected to one or more components by way of the management bus 364. In an embodiment, these components include sensor devices for measuring various operating and performance-related parameters within the computer system 300.

The management bus 364 is used by the BMC 366 to request and/or receive various operating and performance-related parameters from one or more components, which are also communicatively connected to the management bus 364. For instance, in one embodiment, the management bus 364 communicatively connects the BMC 366 to a CPU temperature sensor and a CPU fan (not shown in FIG. 3), thereby providing a means for the BMC 366 to monitor and/or control operation of these components. The BMC 366 may be directly connected to sensors 368. The serial ports 372 and the Ethernet controller 360 may be utilized to establish a connection with the BMC 366.

It should be appreciated that the computer 300 may comprise other types of computing devices, including hand-held computers, embedded computer systems, personal digital assistants, and other types of computing devices known to those skilled in the art. It is also contemplated that the computer 300 may not include all of the components shown in FIG. 3 and/or may include other components that are not explicitly shown in FIG. 3.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A management controller-implemented method, the management controller managing a host computer system, the method comprising:
    initiating, at a processor of the management controller, execution of a first management platform by executing a boot loader that is configured to load the first management platform;
    detecting, at the management controller, whether sensor data exists in firmware data of the management controller and whether a predetermined manufacturer-specific platform identifier identifying a management platform exists in a non-volatile memory location of the management controller;
    in response to the condition that no sensor data and no platform identifier is detected, determining the platform identifier based on at least one of GPIO pin settings on the management controller, information received from BIOS of the host computer, and detection of one or more sensors each unique to a respective particular management platform;
    selecting a set of sensor data from a configuration file based on the determined platform identifier; and
    loading the first management platform and initializing the first management platform with the selected set of sensor data.

2. The method of claim 1, wherein the management controller is a baseboard management controller of the managed host computer having a plurality of hardware components, the plurality of hardware components operating on the first management platform and communicatively coupled to the baseboard management controller, and the baseboard management controller communicatively coupled to a remote management computer that is operative to control functions performed by the management controller and communicate data associated with operations of the plurality of hardware components via at least one network connection.

3. The method of claim 1, wherein detecting the platform identifier based on GPIO pin settings comprises reading predetermined strapping values from at least one dedicated GPIO pin of the management controller.

4. The method of claim 1, wherein detecting whether the platform identifier exists in a non-volatile memory location comprises reading the platform identifier from stored data in an EEPROM device.

5. The method of claim 1, wherein determining the platform identifier based on detection of the one or more unique sensors is performed if the platform identifier cannot be determined based on at least one of GPIO pin settings and the information received from the BIOS.

6. The method of claim 1, wherein determining the platform identifier based on detection of the one or more unique sensors comprises detecting at least one active sensor that is operatively coupled to the management controller and that is operative to monitor the operation of at least one of a plurality of hardware components based on operating parameters.

7. The method of claim 6, wherein the at least one active sensor comprises at least one of a temperature sensor, power status sensor, and network interface sensor.

8. The method of claim 6, further comprising determining the platform identifier based on the detected at least one active sensor, wherein each of a plurality of different manufacturer-specific platform identifiers is definable by a particular configuration of sensors.

9. The method of claim 1, wherein the host computer system comprises a plurality of hardware components, the plurality of hardware components comprising a network interface and the host computer is managed by a remote management computer running a management client application, via network communication link coupled to the management computer and the network interface.

10. The method of claim 1, further comprising: copying the selected sensor data to the firmware data of the management controller.

11. The method of claim 10, further comprising: writing the determined platform identifier to the non-volatile memory location of the management controller.

12. A non-transitory computer-readable medium having stored thereon computer-executable instructions which, when executed by a programmable processor of a computer system, cause the computer system to perform functions comprising:
    initiating, at a processor of the management controller, execution of a first management platform by executing a boot loader that is configured to load the first management platform;
    detecting, at the management controller, whether sensor data exists in firmware data of the management controller and whether a predetermined manufacturer-specific platform identifier identifying a management platform exists in a non-volatile memory location of the management controller;
    in response to the condition that no sensor data and no platform identifier is detected, determining the platform identifier based on at least one of GPIO pin settings on the management controller, information received from BIOS of the host computer, and detection of one or more sensors each unique to a respective particular management platform;
    selecting a set of sensor data from a configuration file based on the determined platform identifier; and
    loading the first management platform and initializing the first management platform with the selected set of sensor data.

13. The non-transitory computer-readable medium of claim 12, wherein detecting the platform identifier based on GPIO pin settings comprises reading predetermined strapping values from at least one dedicated GPIO pin of the management controller.

14. The non-transitory computer-readable medium of claim 12, wherein detecting whether the platform identifier exists in a non-volatile memory location comprises reading the platform identifier from stored data on an EEPROM device.

15. The non-transitory computer-readable medium of claim 12, wherein determining the platform identifier based on detection of the one or more unique sensors is performed if the platform identifier cannot be determined based on at least one of GPIO pin settings and the information received from the BIOS.

16. The non-transitory computer-readable medium of claim 12, wherein determining the platform identifier based on detection of the one or more unique sensors comprises detecting at least one active sensor that is operatively coupled to the management controller and that is operative to monitor the operation of at least one of a plurality of hardware components based on operating parameters.

17. The non-transitory computer-readable medium of claim 16, wherein the at least one active sensor comprises at least one of a temperature sensor, power status sensor, and network interface status sensor.

18. The non-transitory computer-readable medium of claim 16, further comprising determining the platform identifier based on the detected at least one active sensor, wherein each of a plurality of different manufacturer-specific platform identifiers is definable by a particular configuration of sensors.

19. The non-transitory computer-readable medium of claim 12, wherein the computer system comprises a plurality of hardware components, the plurality of hardware components comprising a network interface and the host computer is managed by a remote management computer running a management client application, via a network connection operatively connected to the host computer and the management controller.

20. A computer system, comprising:
    a management controller;
    a system memory comprising a firmware;
    a plurality of hardware components operating on a first management platform and operatively coupled to the management controller; and
    a programmable processor that is programmed to cause the computer system to:
        initiate execution of the first management platform by executing a boot loader from the firmware, the boot loader being configured to load the first management platform;
        detect whether sensor data exists in firmware data of the management controller and whether a predetermined manufacturer-specific platform identifier identifying a management platform exists in a non-volatile memory location of the management controller;
        in response to the condition that no sensor data and no platform identifier is detected, determine the platform identifier based on at least one of GPIO pin settings on the management controller, information received from BIOS of the host computer, and detection of one or more sensors each unique to a respective particular management platform;
        select a set of sensor data from a configuration file based on the determined platform identifier; and
        load the first management platform and initializing the first management platform with the selected set of sensor data.

21. The computer system of claim 20, wherein the programmable processor is programmed to copy the selected sensor data to the firmware data of the management controller.

22. The computer system of claim 21, wherein the programmable processor is programmed to write the determined platform identifier to the non-volatile memory location of the management controller.

23. The computer system of claim 20, wherein detecting the platform identifier based on GPIO pin settings comprises reading predetermined strapping values from at least one dedicated GPIO pin of the management controller.

24. The computer system of claim 20, wherein detecting whether the platform identifier exists in a non-volatile memory location comprises reading the platform identifier from stored data on an EEPROM device.

25. The computer system of claim 20, wherein determining the platform identifier based on detection of the one or more unique sensors comprises detecting a plurality of sensors that are active to monitor the condition of the plurality of hardware components.

26. The computer system of claim 20, further comprising a plurality of sensors operatively coupled to the management controller and that are operative to monitor conditions of the plurality of hardware components.

27. The computer system of claim 26, wherein the plurality of hardware components comprises at least one of a power management module, network interface, and cooling fan.

28. The computer system of claim 27, wherein the plurality of sensors comprises at least one of a temperature sensor, power status sensor, network interface sensor, and cooling status sensor.

29. The computer system of claim 26, wherein the platform identifier is definable by configuration data corresponding to active sensors, the configuration data comprising at least one of the number, arrangement, and operating parameters of the sensors, and wherein determining the platform identifier comprises matching the configuration data with a corresponding stored one of a plurality of different defined platform identifiers.

* * * * *